United States Patent
Asano et al.

(10) Patent No.: US 11,539,323 B2
(45) Date of Patent: Dec. 27, 2022

(54) OPENING AND CLOSING BODY CONTROL APPARATUS FOR A VEHICLE

(71) Applicant: AISIN CORPORATION, Aichi (JP)

(72) Inventors: Ryo Asano, Kariya (JP); Takeshi Nishikibe, Kariya (JP)

(73) Assignee: AISIN CORPORATION, Kariya (JP)

( * ) Notice: Subject to any disclaimer, the term of this patent is extended or adjusted under 35 U.S.C. 154(b) by 48 days.

(21) Appl. No.: 16/745,417

(22) Filed: Jan. 17, 2020

(65) Prior Publication Data

US 2020/0235695 A1 Jul. 23, 2020

(30) Foreign Application Priority Data

Jan. 21, 2019 (JP) .............................. JP2019-007623

(51) Int. Cl.
*H02P 29/40* (2016.01)
*B60J 5/10* (2006.01)
(Continued)

(52) U.S. Cl.
CPC .............. *H02P 29/40* (2016.02); *B60J 5/105* (2013.01); *E05F 1/10* (2013.01); *E05F 3/224* (2013.01);
(Continued)

(58) Field of Classification Search
None
See application file for complete search history.

(56) References Cited

U.S. PATENT DOCUMENTS 4,364,004 A * 12/1982 Bourbeau ............... H02P 25/03
318/721
4,757,241 A * 7/1988 Young ...................... H02P 6/14
318/400.13
(Continued)

FOREIGN PATENT DOCUMENTS

JP 04-285282 10/1992
JP 102889036 A 1/2013
(Continued)

OTHER PUBLICATIONS

Combined Chinese Office Action and Search Report dated May 23, 2022 in Patent Application No. 202010067043.7 (with English translation of Category of Cited Documents), 10 pages.
(Continued)

*Primary Examiner* — Gregory J Strimbu
(74) *Attorney, Agent, or Firm* — Oblon, McClelland, Maier & Neustadt, L.L.P.

(57) ABSTRACT

An opening and closing body control apparatus for a vehicle includes an assist control portion configured to detect an operation of an opening and closing body of the vehicle by an operator or a user and control voltage applied to a motor serving as a drive source which applies a drive force to the opening and closing body during the operation of the opening and closing body by the operator or the user. The assist control portion applies an assist voltage and an offset voltage alternately to the motor to operate an assist control for applying the drive force to the opening and closing body. The assist voltage for rotating the motor at a rotation speed which corresponds to an operation speed of the opening and closing body and the offset voltage being lower than the assist voltage.

10 Claims, 6 Drawing Sheets

(51) Int. Cl.
 *E05F 1/10* (2006.01)
 *E05F 3/22* (2006.01)
 *E05F 15/63* (2015.01)

(52) U.S. Cl.
 CPC ......... *B60J 5/107* (2013.01); *E05F 2015/631* (2015.01)

(56) References Cited

U.S. PATENT DOCUMENTS

| | | | | |
|---|---|---|---|---|
| 5,469,030 | A * | 11/1995 | Takei | B60L 13/03 |
| | | | | 318/135 |
| 5,851,050 | A * | 12/1998 | Squire | E05F 15/49 |
| | | | | 296/146.4 |
| 8,766,575 | B2 * | 7/2014 | Iwaji | H02P 21/04 |
| | | | | 318/400.17 |
| 9,868,340 | B2 * | 1/2018 | Nishikibe | E05F 1/002 |
| 10,530,284 | B2 * | 1/2020 | Hijikata | H02P 8/22 |
| 2008/0272720 | A1 * | 11/2008 | Kausch | H02P 6/17 |
| | | | | 318/400.17 |
| 2014/0049194 | A1 * | 2/2014 | Eggeling | H02M 1/44 |
| | | | | 318/45 |
| 2019/0145145 | A1 * | 5/2019 | Goto | H02P 29/00 |
| | | | | 701/49 |
| 2019/0226262 | A1 * | 7/2019 | Tsuboi | E05F 15/73 |

FOREIGN PATENT DOCUMENTS

| | | |
|---|---|---|
| JP | 105705357 A | 6/2016 |
| JP | 106460441 A | 2/2017 |
| JP | 61 45444 B2 | 6/2017 |

OTHER PUBLICATIONS

Japanese Office Action issued in Japanese Patent Application No. 2019-007623 dated Sep. 13, 2022, (w/ English Translation).

* cited by examiner

$Vb = Va - \alpha$

OPENING AND CLOSING BODY CONTROL APPARATUS FOR A VEHICLE

CROSS REFERENCE TO RELATED APPLICATIONS

This application is based on and claims priority under 35 U.S.C. § 119 to Japanese Patent Application 2019-007623, filed on Jan. 21, 2019, the entire content of which is incorporated herein by reference.

TECHNICAL FIELD

This disclosure generally relates to an opening and closing body control apparatus for a vehicle.

BACKGROUND DISCUSSION

An opening and closing body control apparatus applying drive force to an opening and closing body of a vehicle by employing a motor as a drive source is known in JP6145444B (hereinafter referred to as Patent reference 1). According to Patent reference 1, for example, the opening and closing body control apparatus determines that the opening and closing body is operated by an operator or a user in a case where the opening and closing body operates in operation speed which exceeds a predetermined threshold value. In a case where the opening and closing body control apparatus detects the operation of the opening and closing body, the drive force in an operation direction is applied relative to the opening and closing body. Accordingly, the opening and closing body may be opened and closed by the motor drive system.

Furthermore, when employed in the vehicle, because the opening and closing body is required to be stopped at a position between a fully-closed position and a fully-open position, the drive force relative to the opening and closing body is required to be applied so as to assist the user who opens and closes the opening and closing body. Since the followability relative to the operation of the opening and closing body is an important issue for the assist control described above, further enhancement is required.

A need thus exists for an opening and closing body control apparatus for a vehicle which is not susceptible to the drawback mentioned above.

SUMMARY

According to an aspect of this disclosure, an opening and closing body control apparatus for a vehicle includes an assist control portion detecting an operation of an opening and closing body configured to be provided at the vehicle, controlling voltage applied to a motor serving as a drive source, and applying a drive force to the opening and closing body in a direction in which the operation of the opening and closing body is assisted. The assist control portion applies an assist voltage and an offset voltage alternately to the motor to operate an assist control for applying the drive force to the opening and closing body, the assist voltage for rotating the motor at a rotation speed which corresponds to an operation speed of the opening and closing body, the offset voltage which is lower than the assist voltage.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of an opening and closing body control apparatus for a vehicle will be explained with reference to drawings.

Figure 1:
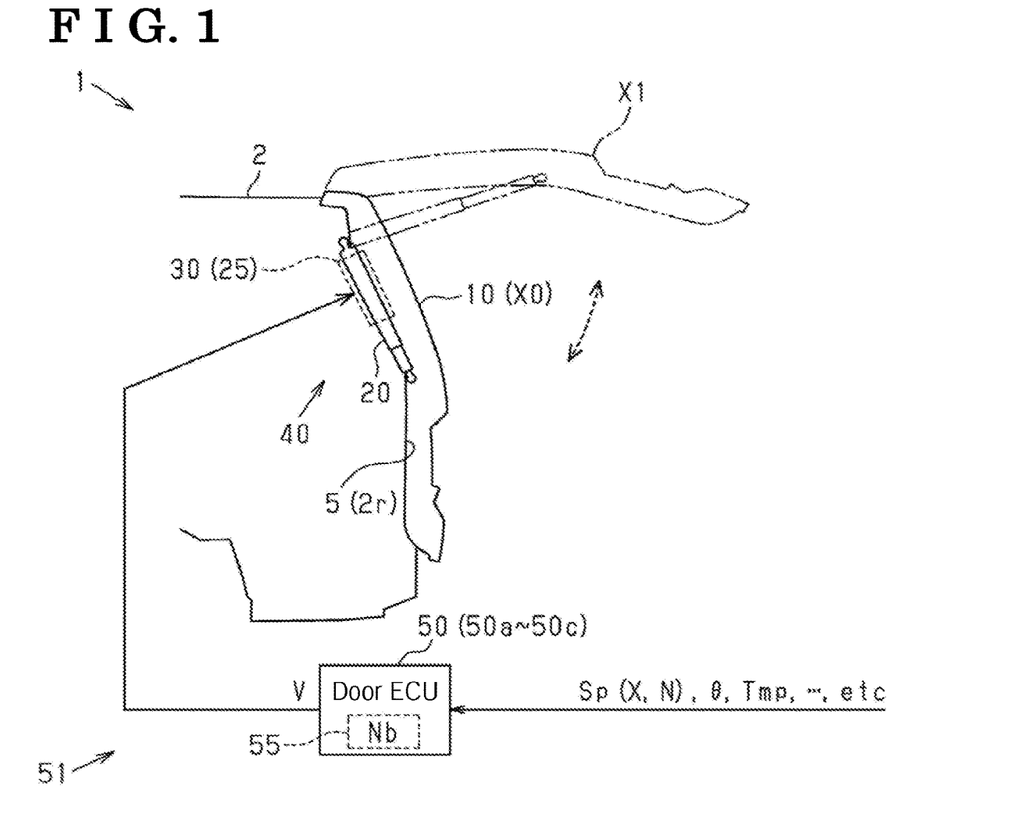
FIG. 1 is a summarized configuration view of an opening and closing body control apparatus for a vehicle according to an embodiment disclosed here.

As illustrated in FIG. 1, a vehicle 1 of the embodiment includes a backdoor 10 which is a so-called flap door at a door opening portion 5 provided at a rear end portion 2r of a vehicle body 2. That is, the backdoor 10 opens upwardly by employing an upper end part of the door opening portion 5 as a rotation fulcrum. A pair of support devices 20 is provided at opposite end portions of the door opening portion 5 in a width direction, the support devices 20 each including an extendable-and-retractable axial shape and each including opposing end portions in an axial direction, the opposing end portions being connected to the vehicle body 2 and the backdoor 10, respectively, so as to be rotatable therewith. Because the support devices 20 support the backdoor 10, the backdoor 10 may be maintained at any operation position X which is between a fully-closed position X0 and a fully-open position X1.

According to the embodiment, the vehicle 1 includes drive devices 30 driving the backdoor 10 as the opening and closing body by employing a motor 25 as a drive source. Specifically, the vehicle 1 of the embodiment includes the drive devices 30 which each is integrally provided with each of the support devices 20. That is, the drive device 30 converts the rotation of the motor 25 into the extending and retracting movement of the support device 20. The vehicle 1 of the embodiment includes a power backdoor device 40 which opens and closes the backdoor 10 based on or in response to the drive force of the motor 25.

Figure 2:
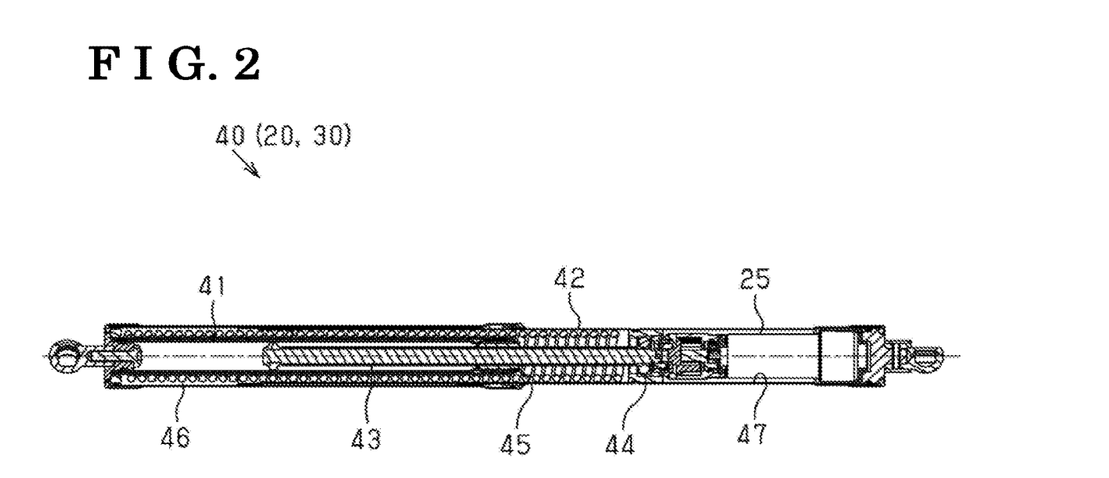
FIG. 2 is a cross sectional view of a power back door apparatus.

In particular, as shown in FIG. 2, the power backdoor device 40 of the embodiment includes an inner tube 41 and an outer tube 42. The inner tube 41 includes a first end that is rotatably connected to one of the vehicle body 2 and the back door 10. The outer tube 42 includes a first end that is rotatably connected to the other of the vehicle body 2 and the backdoor 10 in a state of fitting onto the inner tube 41. The power backdoor device 40 includes a spindle screw 43 which is provided within the inner tube 41 and the outer tube 42 so as to be coaxial therewith. In the power backdoor device 40 of the embodiment, the spindle screw 43 is axially and rotatably supported by a bearing 44 fixed inside the outer tube 42. The power backdoor device 40 includes a spindle nut 45 fixed inside the inner tube 41 so as to be threaded to the spindle screw 43. In the power backdoor device 40 of the embodiment, the inner tube 41 and the outer tube 42 are relatively displaced from each other in an axial direction in accordance with the rotation of the spindle screw 43.

The power backdoor device 40 of the embodiment includes a compression coil spring 46 which is provided between the inner tube 41 and the outer tube 42 in a state where a first end of the compression coil spring 46 fits onto the inner tube 41 and a second end of the compression coil spring 46 is disposed inside the outer tube 42. That is, the power backdoor device 40 of the embodiment biases the inner tube 41 and the outer tube 42 in a direction in which the inner tube 41 and the outer tube 42 that are concentrically provided with each other extend, that is, in which the backdoor 10 opens, based on or in response to the elastic force of the compression coil spring 46. The power backdoor device 40 in the embodiment functions as the support devices 20 supporting the backdoor 10 in the open state.

The power backdoor device 40 of the embodiment includes, at the first end of the outer tube 42, an accommodation chamber 47 for the motor 25 which serves as the drive source. That is, the power backdoor device 40 of the embodiment relatively moves the inner tube 41 and the outer tube 42 in the axial direction, the inner tube 41 and the outer tube 42 that are concentrically provided with each other by rotating the spindle screw 43 by employing the motor 25 as the drive source. The power backdoor device 40 of the embodiment generates the drive force for opening and closing the backdoor 10.

In particular, as illustrated in FIG. 1, a door Electric Control Unit 50 or a door ECU 50 controls the operation of the power backdoor device 40 of the embodiment, the door ECU 50 serving as a control device. The vehicle 1 of the embodiment includes an opening and closing body control apparatus 51 which controls the opening and closing operation of the backdoor 10.

Specifically, the door ECU 50 of the embodiment controls voltage V applied to the motor 25 serving as the drive source. The power backdoor device 40 of the embodiment outputs pulse signals Sp synchronized with the rotation of the motor 25. The door ECU 50 detects an operation position X and an operation speed N of the backdoor 10 by counting edges of the pulse signals Sp. In the embodiment, the operation speed N of the backdoor 10 is expressed by a rotation speed of the motor per unit time which is rotations per minute or rpm. The door ECU 50 of the embodiment controls the operation of the power backdoor device 40 serving as the drive device 30, that is, the application of the drive force relative to the back door 10 in response to the detection of the operation position X and the operation speed N.

The assist control of the backdoor 10 operated by the door ECU 50 of the embodiment will hereunder be explained.

Figure 3:
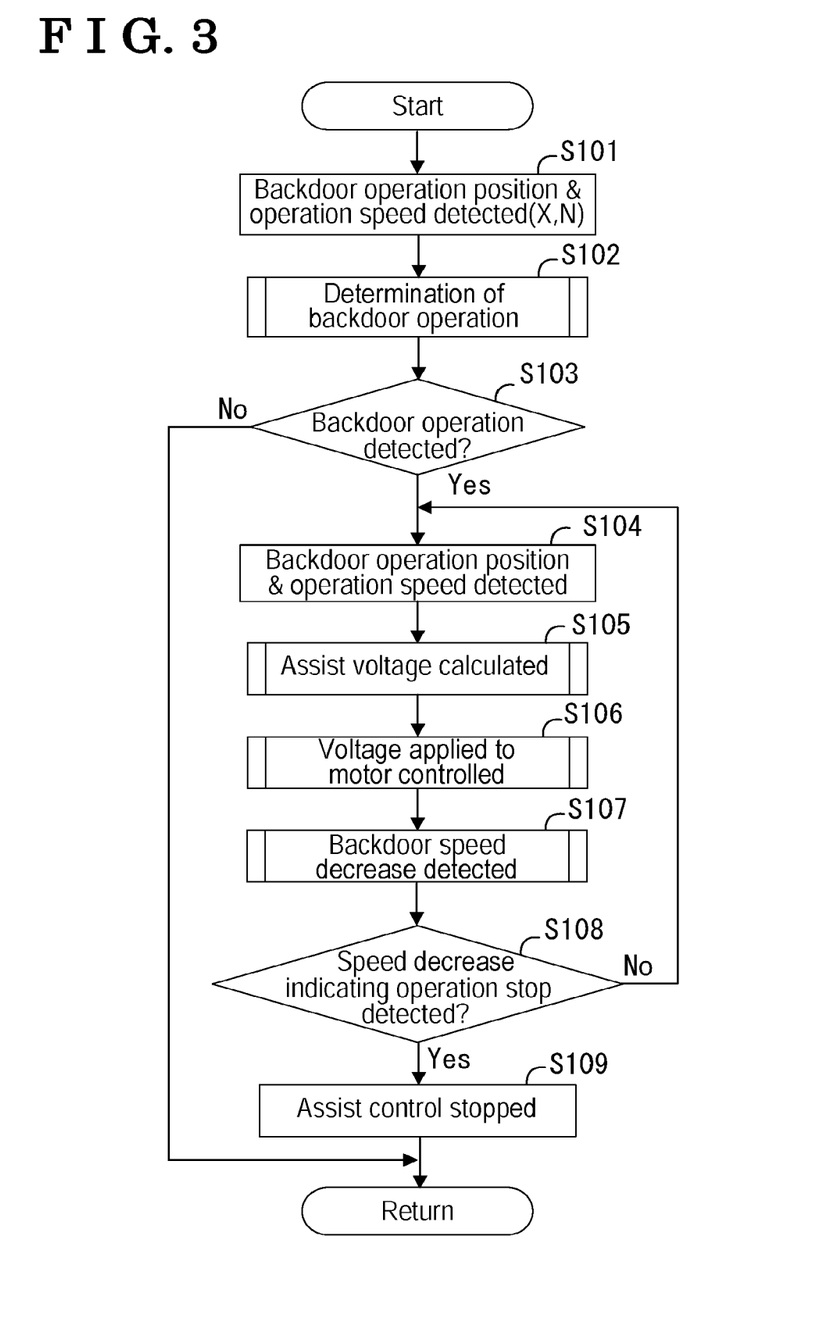
FIG. 3 is a flowchart illustrating a procedure of assist control.

As illustrated in a flowchart in FIG. 3, in a case of detecting the operation position X and the operation speed N of the back door 10 (Step S101), the door ECU 50 of the embodiment determines whether the opening or closing operation of the backdoor 10 by an operator or a user is performed based on the operation position X and the operation speed N of the back door 10 (Step S102). Accordingly, in a case of detecting the operation of the backdoor 10 (Step S103: YES), the door ECU 50 of the embodiment operates the assist control for applying the drive force, that is, the assist force, in a direction in which the operation of the backdoor 10 is assisted (Step S104 to Step S106).

Figure 4:
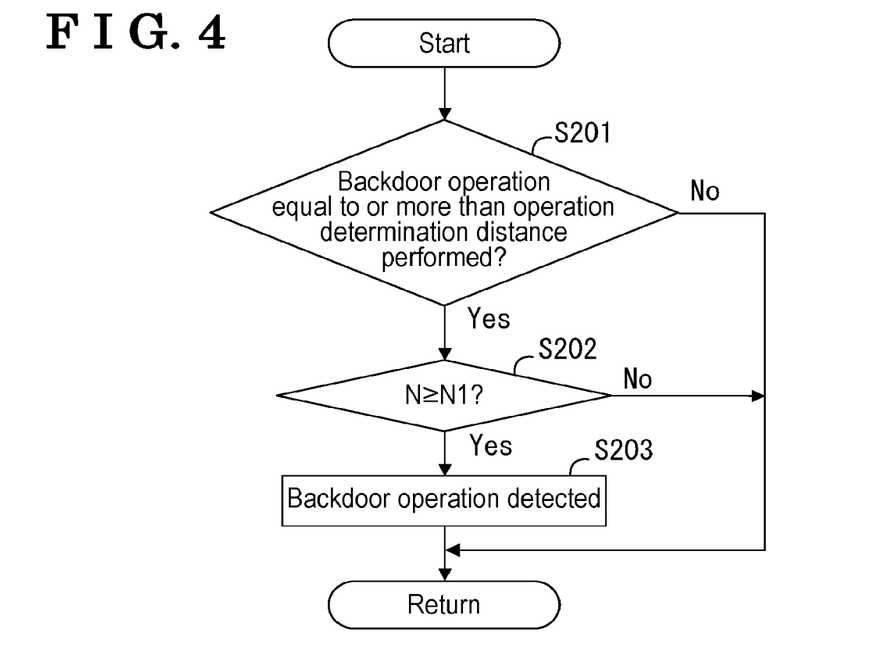
FIG. 4 is a flowchart illustrating a procedure of operation determination.

Specifically, as illustrated in a flowchart in FIG. 4, the door ECU 50 of the embodiment determines whether the operation position X of the backdoor 10 changes by a predetermined amount, that is, whether the backdoor 10 operates equal to or greater than a predetermined operation determination distance (Step S201), when a backdoor operation is determined in Step S102. In a case of detecting that the backdoor 10 operates equal to or greater than the predetermined operation determination distance in Step S201 (Step S201: YES), the door ECU 50 determines whether the operation speed N is equal to or greater than a predetermined speed N1 (Step S202). In a case of detecting the operation speed N which is equal to or greater than the predetermined speed N1 ($N \geq N1$, Step S202: YES), the door ECU 50 determines that the backdoor 10 is operated (Step S203).

As shown in a flowchart in FIG. 3, in a case of detecting the operation of the backdoor 10 by the process from Step S101 to Step S103, the door ECU 50 of the embodiment detects the operation position X and the operation speed N of the backdoor 10 (Step S104). The door ECU 50 calculates an assist voltage Va for applying the assist force to the backdoor 10 in response to the operation speed N of the backdoor 10 (Step S105). The door ECU 50 of the embodiment controls a voltage V applied to the motor 25 serving as the drive source of the power backdoor device 40 based on the assist voltage Va calculated in Step S105 (Step S106).

Figure 5:
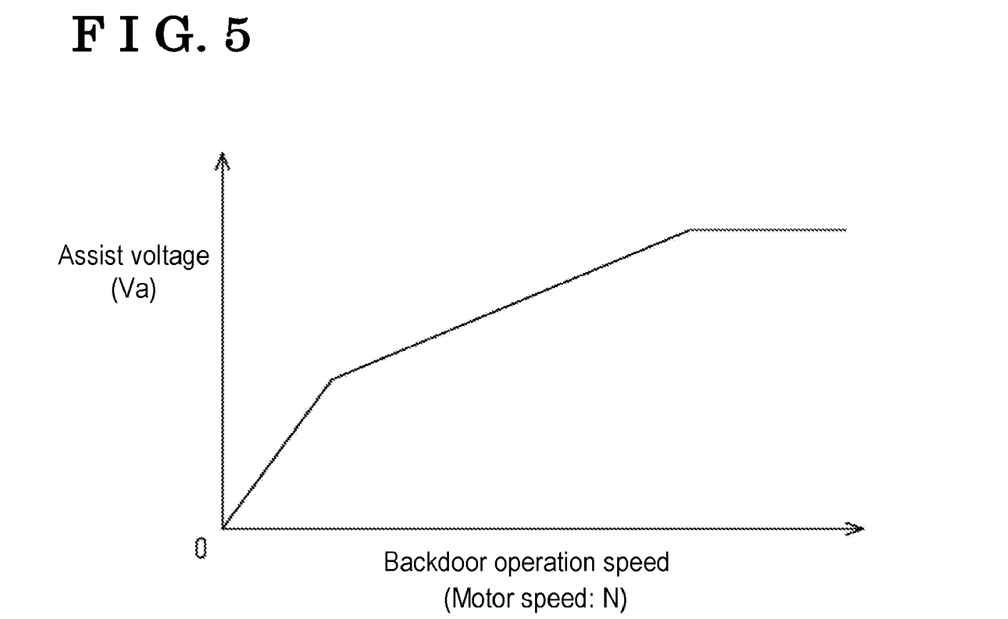
FIG. 5 is an explanatory view of an assist voltage calculated based on operation speed of a back door.

In particular, as shown in FIG. 5, the door ECU 50 of the embodiment calculates the assist voltage Va including greater value as the operation speed N of the backdoor 10 expressed by the motor rotation speed increases. That is, the higher the voltage V applied to the motor 25 is, the faster the motor 24 rotates. Based on this point, as described above, the door ECU 50 calculates the assist voltage Va for rotating the motor 25 at a rotation speed that corresponds to or supports the operation speed N of the backdoor 10. The door ECU 50 of the embodiment applies the appropriate assist force to the backdoor 10 which is opened and closed by the operation of the user.

In the embodiment, the voltage V applied to the motor 25 is expressed by a duty ratio of pulse width modulation control or PWM control operated by the door ECU 50. The door ECU 50 of the embodiment calculates the assist voltage Va which corresponds to or supports the operation speed N of the backdoor 10 by maintaining a control map shown in FIG. 5 or a calculation table in a storage region 55.

As illustrated in the flowchart in FIG. 3, the door ECU 50 of the embodiment operates the speed decrease determination of the back door 10 during the operation of the assist control (Step S107). In a state of detecting a decrease of the operation speed N indicating the stop of the operation relative to the back door 10 as a result of the speed decrease determination in Step S107 (Step S108: YES), the door ECU 50 of the embodiment stops the operation of the assist control of the application of the voltage to the motor 25 which serves as the drive source (Step S109).

Specifically, the door ECU 50 of the embodiment maintains the operation speed N of the back door 10 to the storage region 55 at a time point whenever the operation position X of the back door 10 changes (see FIG. 1). The door ECU 50 operates the speed decrease determination in Step S107 in response to the comparison between an operation speed Nb which is immediately before being stored in the storage region 55 and the current operation speed N.

Figure 6:
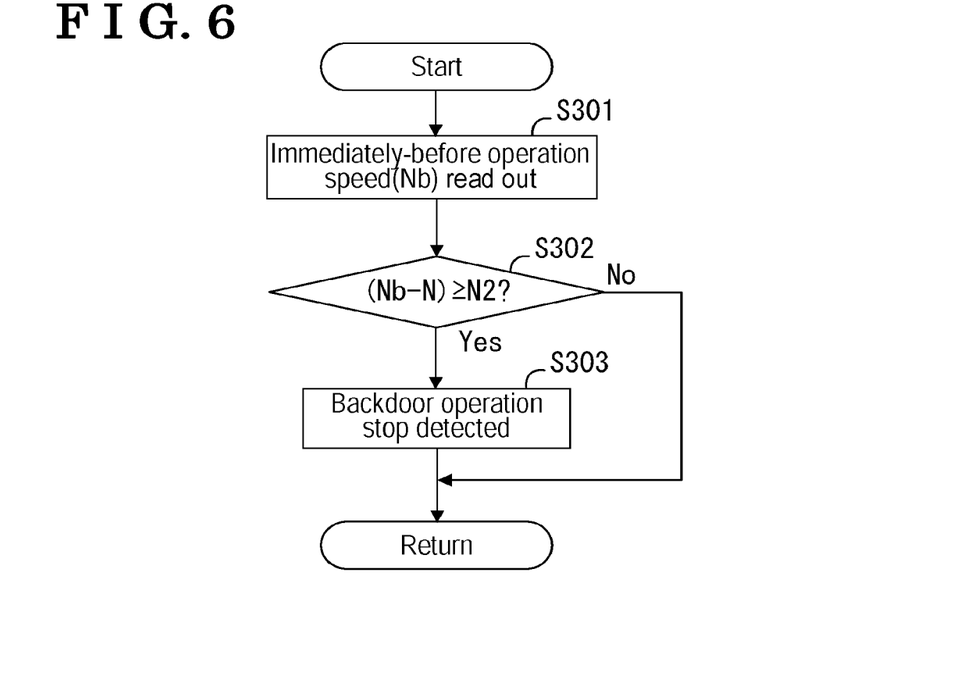
FIG. 6 is a flowchart illustrating a procedure of an operation stop determination based on a decrease of speed.

In particular, as illustrated in a flowchart in FIG. 6, in the speed decrease determination in Step S107, the door ECU 50 of the embodiment reads out an operation speed which is before the back door 10 moves by a predetermined stop determination distance as the operation speed Nb which is immediately before being stored in the storage region 55 (Step S301). Next, the door ECU 50 compares a value which is summed by the subtraction of the operation speed N from the operation speed Nb which is immediately before being stored in the storage region 55 with a predetermined decreased speed threshold value N2 (Step S302). In Step S302, in a case where a value summed by the subtraction of the current operation speed N from the immediately-before operation speed Nb is equal to or greater than the predetermined decreased speed threshold value N2 (Step S302: YES, (Nb−N)≥N2), the door ECU 50 determines that the decrease of the operation speed N of the back door 10 indicating the stop of the operation is detected (Step S303).

That is, the operation speed N of the back door 10 decreases as the operation force by the user decreases. As the operation speed N decreases, the assist voltage Va calculated in Step S105 decreases. Accordingly, the operation speed N of the backdoor 10 further decreases as the voltage V applied to the motor 25 serving as the drive source decreases.

The door ECU 50 of the embodiment detects the decrease of the operation speed N caused by the stop of the operation of the back door 10 by the user in Step S107. Accordingly, the operation of the assist control is stopped so that the application of the drive force relative to the back door 10 is operated after the operation of the back door 10 by the user.

Figure 7:
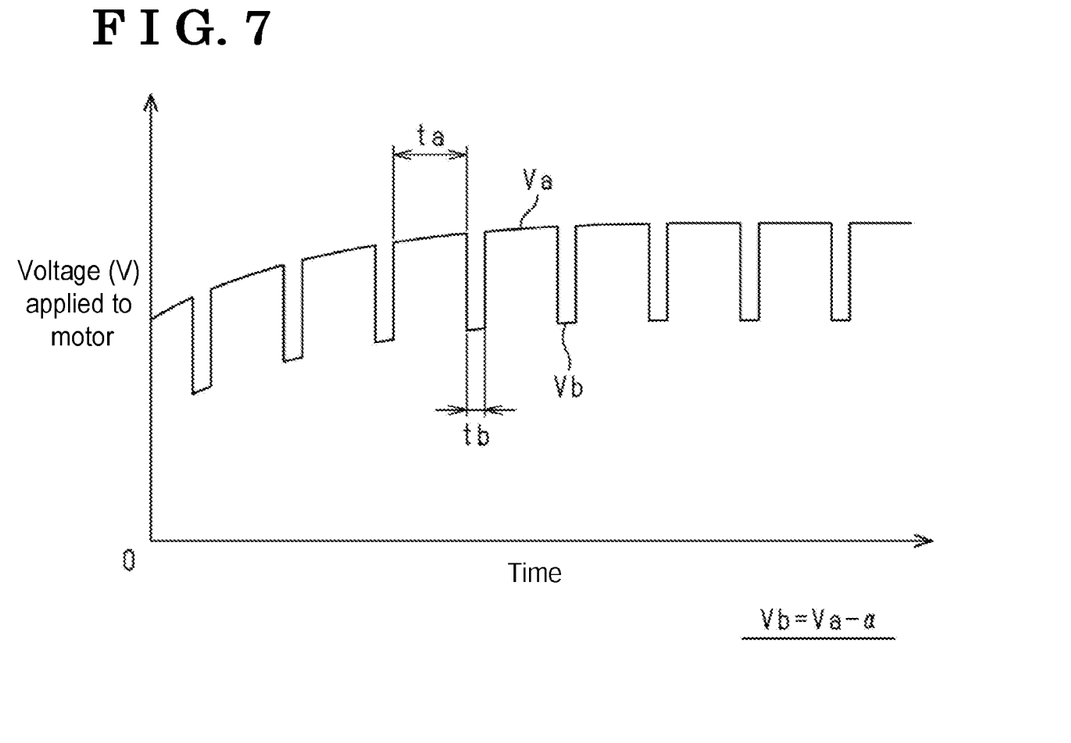
FIG. 7 is an explanatory view of voltage applied to a motor.

Further in detail, as illustrated in FIG. 7, the door ECU 50 of the embodiment calculates an assist voltage Va and an offset voltage Vb. The assist voltage Va corresponds to a voltage for rotating the motor 25 at the rotation speed which corresponds to or supports the operation speed N of the hack door 10, The offset voltage Vb is lower than the assist voltage Va. The assist voltage Va and the offset voltage Vb include the same reference numeral V. The door ECU 50 of the embodiment alternately applies the assist voltage Va and the offset voltage Vb to the motor 25 when the voltage control is operated in Step S106.

Specifically, the door ECU 50 of the embodiment calculates the offset voltage Vb by subtracting a predetermined offset value α from the assist voltage Va calculated in Step S105 (Vb=Va−α). An application time tb of the offset voltage Vb is set shorter than an application time ta of the assist voltage Va. For example, the application time ta of the assist voltage Va is set approximately several hundred millimeter seconds, whereas the application time tb of the offset voltage Vb is set from a fraction of, to one-tenth of the application time ta. The door ECU 50 of the embodiment may apply the appropriate assist force to the back door 10 by following the operation of the user, and may stop the operation of the assist control speedily or promptly after the user stops the operation.

That is, the operation speed N of the opening and closing body of the vehicle 1 such as the back door 10 may be difficult to decrease even after the user stops the operation. In this case, the assist voltage Va calculated in response to the operation speed N of the back door 10 may be difficult to be decreased. Accordingly, because the decrease of the operation speed N is delayed, the followability relative to the operation of the user may be decreased.

Figure 8:
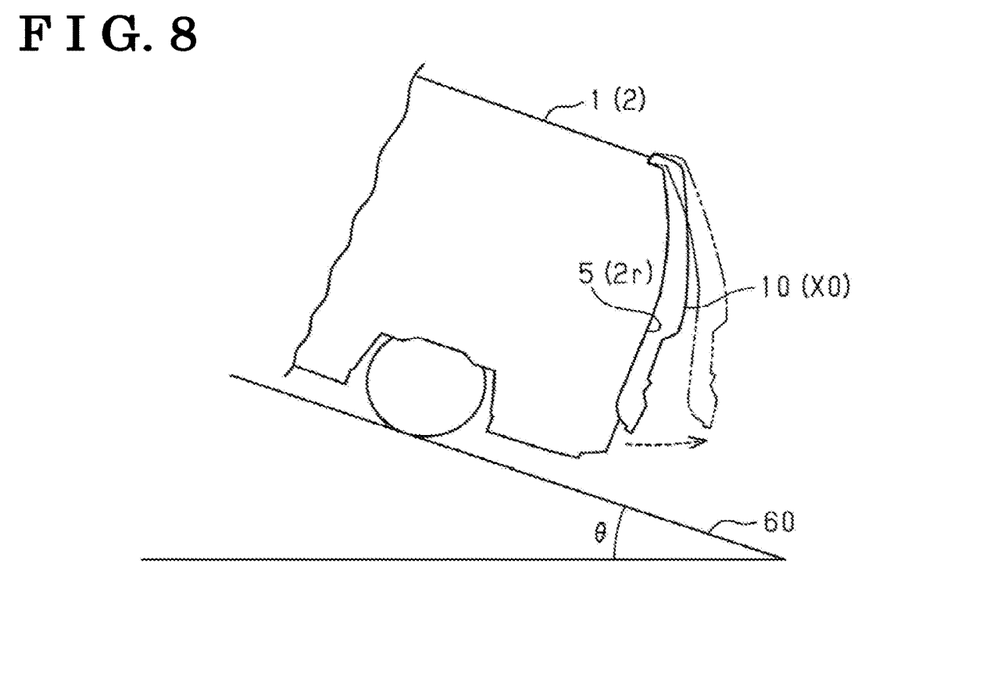
FIG. 8 is an explanatory view of a special state in which the operation speed of an opening and closing body is difficult to decrease even after the operation is stopped.

For example, as shown in FIG. 8, in a case where, for example, the vehicle 1 is on an inclined path 60, the backdoor 10 may be biased in the operation direction due to the inclination of the vehicle 1. That is, the vehicle 1 shown in FIG. 8 is in an inclined state in the front-rear direction and has a rear end portion 2r which is disposed downward, the rear end portion 2r where the backdoor 10 is provided. Further, the backdoor 10 is in a biased state in an opening direction by gravity due to the inclination of the vehicle 1. In the vehicle 1, the biasing action by the inclination tends to be remarkable in a case where the backdoor 10 is disposed close to the fully-closed position X0 due to such inclination.

That is, in a state where the user stops the opening operation at the operation position X which is close to the fully-closed position X0, the operation speed N of the backdoor 10 of the vehicle 1 shown in this example is difficult to be decreased. In this case, because the timing to stop the assist control is delayed due to the delay of the speed decrease, the backdoor 10 may be operated in the opening direction relative to a desired stop position.

Based on this point, the door ECU 50 of the embodiment applies the assist voltage Va and the offset voltage Vb alternately relative to the motor 25, the assist voltage Va for rotating the motor 25 at the rotation speed which corresponds to or supports the operation speed N of the backdoor 10, the offset voltage Vb that is lower than the assist voltage Va. Accordingly, because a voltage decrease area where the rotation speed of the motor 25 decreases is periodically provided, the operation speed N of the backdoor 10 may speedily decrease after the user stops the operation.

That is, the user of the backdoor 10 applies the operation force to the backdoor 10 as complimenting the decrease of the assist force due to the application of the offset voltage Vb to the motor 25, the offset voltage Vb which is lower than the assist voltage Va. Accordingly, the backdoor 10 may be operated with the desired operation speed N.

Meanwhile, after the user stops the operation of the backdoor 10, the assist force which decreases due to the application of the offset voltage Vb is not complemented so that the operation speed N of the backdoor 10 is decreased at the voltage decrease area based on the offset voltage Vb. Then, the smaller assist voltage Va and the offset voltage Vb are calculated based on the decreased operation speed N. The door ECU 50 of the embodiment may stop the operation of the assist control speedily by the further decrease of the operation speed N of the backdoor 10.

Next, according to the aforementioned embodiment, following effects may be attained.

(1) The door ECU 50 serving as an assist control portion 50a detects the operation of the backdoor 10 which serves as the opening and closing body of the vehicle 1, and controls the voltage V applied to the motor 25 serving as the drive source of the backdoor 10 to apply the drive force in a direction in which the operation is complemented. The door ECU 50 alternately applies the assist voltage Va and the offset voltage Vb to the motor 25 to operate the assist control for applying the drive force to the back door 10, the assist voltage Va for rotating the motor 25 at the rotation speed which corresponds to or supports the operation speed N of the backdoor 10, the offset voltage Vb which is lower than the assist voltage Va.

According to the aforementioned configuration, by applying the assist voltage Va for rotating the motor 25 at the rotation speed which corresponds to or supports the operation speed N of the backdoor 10 opened and closed by the operation of the user, the door ECU 50 may appropriately apply the assist force relative to the backdoor 10 so as to follow the operation. Because the door ECU 50 applies alternately the assist voltage Va and the offset voltage Vb which is lower than the assist voltage Va, the voltage decrease area where the rotation speed of the motor 25 decreases is formed periodically. Thus, after the user stops the operation, the operation speed N of the backdoor 10 may speedily decrease. As a result, the followability relative to the operation of the backdoor 10 may be enhanced.

(2) The application time tb of the offset voltage Vb is set shorter than the application time to of the assist voltage Va.

According to the aforementioned configuration, the assist force may be appropriately applied without making the user who operates the backdoor 10 uncomfortable, and at the same time, and the operation speed N of the backdoor 10 may speedily decrease after the user stops the operation.

(3) The door ECU 50 serving as an assist stop portion 50b stops the operation of the assist control after detecting the decrease of the operation speed N of the back door 10, the operation speed indicating the stop of the operation.

That is, by monitoring the decrease of the operation speed N, the door ECU 50 may detect that the operation of the back door 10 is stopped with a simple configuration. The door ECU 50 stops the operation of the assist control in accordance with the detection so that the followability relative to the operation of the back door 10 may be enhanced.

The operation speed N of the opening and closing body of the vehicle 1, which is as the back door 10, the operation speed N may be difficult to decrease even after the user stops operation. However, even in this case, according to the configuration shown in (1), the operation speed N of the back door 10 may speedily decrease after the user stops the operation. Accordingly, the assist control may be stopped speedily.

The above described embodiment may be modified as follows;

In the embodiment, the support devices 20 supporting the back door 10 and the drive devices 30 applying the drive force to the back door 10 which has the motor 25 as the drive source are integrally provided as the power backdoor device 40. Alternatively, the support devices 20 and the drive devices 30 may be separately provided. Each of the configurations of the support devices 20 and the drive devices 30 may be freely changed.

According to the aforementioned embodiment, in a case of detecting that the back door 10 operates equal to or greater than a predetermined operation determination distance, and in a case where the operation speed N is equal to or greater than the predetermined speed N1, the door ECU 50 determines that the operation of the backdoor 10 is detected and operates the assist control. Alternatively, the operation determination method may be freely changed.

In the aforementioned embodiment, in a case where a value calculated by the subtraction of the current operation speed N from the immediately-before operation speed Nb corresponds to equal to or greater than the predetermined decreased speed threshold value N2, the door ECU 50 determines that the decrease of the operation speed N indicating the stop of the operation relative to the backdoor 10 is detected, and stops the operation of the assist control. Alternatively, for example, in a case where the operation speed N of the backdoor 10 corresponds to equal to or lower than a predetermined threshold value, the door ECU 50 may determine that the decrease of the operation speed N indicating the stop of the operation is detected. The door ECU 50 may employ a method other than monitoring the decrease of the operation speed of the backdoor 10, the method stopping the operation of the assist control after detecting the stop of the operation of the user.

According to the aforementioned embodiment, the offset voltage Vb is calculated by the subtraction of the predetermined offset value α from the assist voltage Va (Vb=Va−α).

Alternatively, for example, the door ECU 50 may employ other methods, for example, multiplying a predetermined coefficient, to calculate the offset voltage Vb which is lower than the assist voltage Va.

Figure 9:
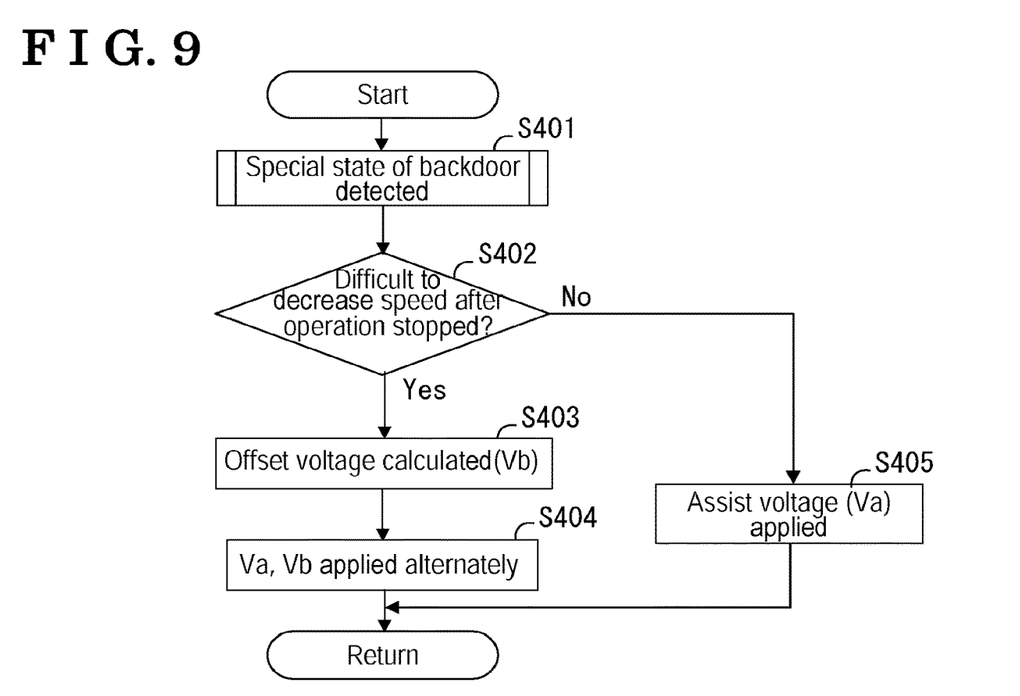
FIG. 9 is a flowchart illustrating a procedure of an assist control of a modified example of the embodiment.

As shown in a flowchart in FIG. 9, the door ECU 50 serving as a special state detection portion 50c operates the special state determination whether the operation speed N of the backdoor 10 is difficult to decrease even after the user stops the operation (Step S401). In a state of determining this special state (Step S402: YES), the door ECU 50 calculates the offset voltage Vb (Step S403), and applies, as in the embodiment, the assist voltage Va and the offset voltage Vb alternately to the motor 25 (Step S404). As a result of the special state determination in Step S401, in a state where the door ECU 50 determines that the operation speed N of the backdoor 10 is difficult to decrease after the operation of the user (Step S402: NO), the door ECU 50 may operate the assist control by the application of the assist voltage Va relative to the motor 25.

According to the aforementioned embodiment, even in the special state where the operation speed N of the backdoor 10 is difficult to decrease, the operation speed N may speedily decrease after the user stops the operation. Then, in a normal state, the appropriate assist force may be applied to the back door 10.

Figure 10:
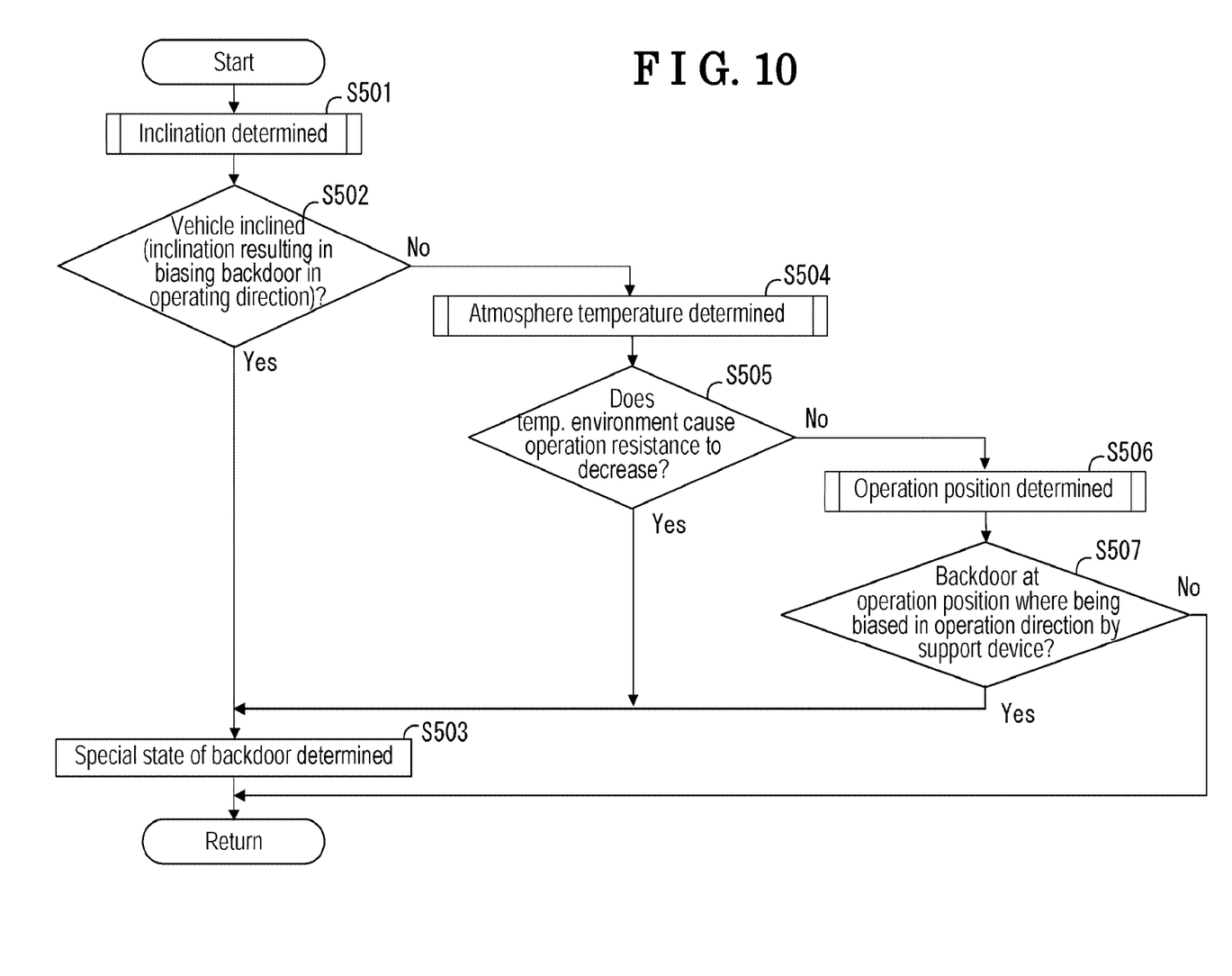
FIG. 10 is a flowchart illustrating an example of special state determination.

In particular, for example, as illustrated in a flowchart in FIG. 10, the door ECU 50 detects an inclination θ of the vehicle 1 (see FIG. 8), and operates the special state determination in response to the inclination θ of the vehicle 1 (Step S501). In a case of determining that the inclination θ of the vehicle 1 leads to or results in the biasing of the backdoor 10 in the operation direction (Step S502: YES), the door ECU 50 may determine that the backdoor 10 is in the special state in which the operation speed N is difficult to decrease even after the user stops the operation (Step S503).

The inclination θ of the vehicle 1 may be detected by, for example, an acceleration sensor, provided at the vehicle 1. It is favorable that the operation position X of the backdoor 10 is employed in accordance with the inclination θ for the special state determination in response to the inclination θ of the vehicle 1. Accordingly, the accuracy of the special state determination may be further enhanced.

Alternatively, the door ECU 50 may detect an environment temperature Tmp of the vehicle 1 to operate the special state determination in response to the environment temperature Tmp. That is, in the vehicle 1, the operation resistance of the backdoor 10 may be changed in response to a temperature environment. For example, the viscosity of lubricant may decrease in high temperature. The sliding resistance of a resin material employed at a sliding part may decrease in low temperature. Accordingly, the operation resistance of the backdoor 10 decreases so that the operation speed N of the backdoor 10 is difficult to decrease even after the user stops the operation.

Based on this point, as illustrated in FIG. 10, the door ECU 50 operates the special state determination based on the environment temperature Tmp (Step S504). In a case of determining that the backdoor 10 is in the temperature environment causing the operation resistance of the backdoor 10 to be decreased (Step S505: YES), the door ECU 50 may determine that the backdoor 10 is in the special state in which the operation speed N is difficult to decrease even after the user stops the operation (Step S503).

Alternatively, the door ECU 50 may operate the special state determination based on the operation position X of the backdoor 10. That is, the backdoor 10 of the vehicle 1 may include the operation position X in which the backdoor 10 is biased in the operation direction in response to the support force of the support device 20 supporting the backdoor 10. For example, according to the power backdoor device 40 of the aforementioned embodiment, in a case where the operation position X of the backdoor 10 includes a position in which the elastic force of the compression coil spring 46 generating the support force as the support device 20 is greater than the internal resistance, the backdoor 10 may be biased in the operating direction in response to the support force of the support device 20.

Based on this point, as shown in FIG. 10, the door ECU 50 determines the special state based on the operation position X of the backdoor 10 (Step S506). Since the characteristic of the support force of the back door 10 generated by the support device 20 depends on, for example, a type or a position of the support device 20, it is favorable that the determination method which supports or corresponds to the individual vehicle 1 is operated. As mentioned above, in a case where the door ECU 50 determines that the backdoor 10 is disposed at the operation position X so as to be biased in the operating direction based on the support force of the support device 20 (Step S507), the door ECU 50 may determine that the backdoor 10 is in a special state in which the operation speed N of the backdoor 10 is difficult to decrease even after the user stops the operation (Step S503).

Furthermore, the disclosure may include the configuration in which the special state is determined with a method other than the method shown in FIG. 10. Plural special state determination methods including the example shown in FIG. 10 may be freely combined.

In the aforementioned embodiment, the vehicle 1 includes the backdoor 10 serving as the opening and closing body at the rear end portion 2r of the vehicle body 2. Alternatively, the disclosure may be applied to other types of doors of the vehicle, for example, side doors so-called gull-wing doors or vertical flip doors. In addition, the disclosure may be applied to an opening and closing body of the vehicle, the opening and closing body which opens and closes in the direction other than the upward-downward direction.

According to the aforementioned embodiment, the opening and closing body control apparatus 51 for the vehicle 1 includes the assist control portion 50a detecting an operation of the backdoor 10 configured to be provided at the vehicle 1, controlling voltage applied to the motor 25 serving as the drive source, and applying the drive force to the backdoor 10 in a direction in which the operation of the backdoor 10 is assisted. The assist control portion 50a applies the assist voltage Va and the offset voltage Vb alternately to the motor 25 to operate the assist control for applying the drive force to the backdoor 10, the assist voltage Va for rotating the motor 25 at the rotation speed which corresponds to the operation speed of the backdoor 10, the offset voltage Vb which is lower than the assist voltage Va.

According to the aforementioned configuration, by applying the assist voltage Va for rotating the motor 25 at the rotation speed which supports or corresponds to the operation speed of the back door 10 (the opening and closing body) which is operated by the user, the door ECU 50 may apply the drive force, that is, the assist force, to the back door 10 appropriately in the direction in which the operation is assisted, by following the operation of the back door 10. Furthermore, because the door ECU 50 applies the assist voltage Va and the offset voltage Vb which is lower than the assist voltage Va alternately, the voltage decrease area where the rotation speed of the motor 25 decreases is generated periodically. Accordingly, the operation speed of the back door 10 may decrease speedily after the user stops the operation. As a result, the followability relative to the operation of the back door 10 may be enhanced.

That is, the user of the back door 10 operates the back door 10 so as to complement the decrease of the assist force even in a case where the voltage decrease area is generated. Accordingly, the back door 10 may be operated at desired operation speed.

On the other hand, the operation speed of the back door 10 may decrease because the assist force is not complemented, the assist force which decreases due to the generation of the voltage decrease area, after the operation of the back door 10 is stopped. Because the assist voltage Va and the offset voltage Vb both including smaller value are calculated based on the decreased operation speed, the speedy speed decrease may be secured after the user stops the operation.

According to the aforementioned embodiment, the application time tb of the offset voltage is shorter than the application time to of the assist voltage.

According to the aforementioned configuration, the assist force may be appropriately applied without making the user operating the back door 10 uncomfortable. At the same time, the operation speed of the back door 10 may decrease speedily after the user stops the operation.

According to the aforementioned embodiment, the opening and closing body control apparatus 51 for the vehicle 1 further includes the assist stop portion 50b stopping the operation of the assist control when detecting decrease of the operation speed indicating the stop of the operation relative to the back door 10.

That is, the assist stop portion 50b may detect that the operation of the back door 10 is stopped with a simple configuration by monitoring the decrease of the operation speed. The assist stop portion 50b stops the assist control in accordance with the detection so that the followability relative to the operation of the back door 10 may be enhanced.

The back door 10 of the vehicle 1 may be put in a state in which the operation speed thereof is difficult to decrease even after the user stops the operation. However, even in this case, because the assist voltage Va and the offset voltage Vb which is lower than the assist voltage Va are applied alternately, the operation speed of the back door 10 may speedily decrease after the user stops the operation. Accordingly, the assist control may be speedily stopped.

According to the aforementioned embodiment, the opening and closing body control apparatus 51 for the vehicle 1 further includes the special state detection portion 50c detecting that the back door 10 is in the special state in which the operation speed is difficult to decrease after the user stops the operation. The assist control portion 50a applies the offset voltage Vb and the assist voltage Va alternately by calculating the offset voltage Vb in a case where the special state is detected.

According to the aforementioned embodiment, even in a case where the operation speed of the back door 10 is difficult to decrease, that is, even in a case where the back door 10 is in the special state, the operation speed may speedily decrease after the user stops the operation. In the normal mode, the appropriate assist force may be applied to the back door 10.

According to the aforementioned embodiment, the special state detection portion 50c determines that the back door 10 is in the special state in a case where the inclination of the vehicle 1 is detected, the inclination causing the back door 10 to be biased in the operation direction thereof.

That is, for example, in a case where the vehicle 1 is on the inclined path 60, the operation speed of the back door 10 may be difficult to decrease even after the user stops the operation because the back door 10 is biased in the opening direction due to the inclination of the vehicle. However, according to the aforementioned embodiment, even in the special state, the operation speed may speedily decrease after the user stops the operation.

According to the aforementioned embodiment, the special state detection portion 50c determines that the back door 10 is in the special state in a case where the back door 10 is in the temperature environment where the operation resistance of the back door 10 decreases.

That is, the operation speed of the back door 10 may be difficult to decrease even after the user stops the operation because the operation resistance of the back door 10 decreases due to the change of the temperature environment. However, according to the aforementioned configuration, even in this special state, the operation speed may speedily decrease after the user stops the operation.

According to the aforementioned embodiment, the opening and closing body control apparatus 51 for the vehicle 1 further includes the support device 20 supporting the back door 10. The special state detection portion 50c determines that the backdoor 10 is in the special state in a case where the backdoor 10 is disposed at the operation position where the backdoor 10 is biased in the operation direction thereof in response to the support force of the support device 20.

That is, the back door 10 of the vehicle 1 may include the operation position where the back door 10 is biased in the operation direction in response to the support force of the support device 20. Accordingly, the operation speed of the back door 10 may be difficult to decrease even after the user stops the operation. However, according to the aforementioned configuration, even in this special state, the operation speed may speedily decrease after the user stops the operation.

According to the disclosure, the drive force which follows the operation of the back door 10 may be applied thereto.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An opening and closing body control apparatus for a vehicle, comprising:
an assist control portion configured to
determine an operation speed and an operation position of an opening and closing body of the vehicle while an operation of the opening and closing body is performed by a user to move the opening and closing body to open or close the opening and closing body;
apply an assist voltage and an offset voltage alternately to a motor to apply a drive force to the opening and closing body while the operation of the opening and closing body is performed by the user, the assist voltage and the offset voltage being based on the operation speed and the operation position of the opening and closing body, the assist voltage being a voltage for rotating the motor at a rotation speed which corresponds to the operation speed of the opening and closing body, and the offset voltage being a voltage calculated by subtracting a predetermined offset value from the assist voltage;
detect a decrease in the operation speed of the opening and closing body by
obtaining a current operation speed of the opening and closing body,
obtaining a stored operation speed of the opening and closing body, the stored operation speed being stored before the opening and closing body moves a predetermined stop determination distance, and
calculating a difference between the current operation speed of the opening and closing body and the stored operation speed of the opening and closing body,
determine that the operation of the opening and closing body by the user has stopped when the difference between the current operation speed of the opening and closing body and the stored operation speed of the opening and closing body is greater than or equal to a predetermined threshold, and
stop the application of the drive force by the motor when it is determined that the operation of the opening and closing body by the user has stopped.

2. The opening and closing body control apparatus for the vehicle according to claim 1, wherein an application time of the offset voltage is shorter than an application time of the assist voltage.

3. The opening and closing body control apparatus for the vehicle according to claim 2, further comprising
a special state detection portion for detection when the opening and closing body is in a special state; wherein
the assist control portion applies the offset voltage and the assist voltage alternately to the motor when the special state is detected.

4. The opening and closing body control apparatus for the vehicle according to claim 1, further comprising
a special state detection portion for detection when the opening and closing body is in a special state; wherein
the assist control portion applies the offset voltage and the assist voltage alternately to the motor when the special state is detected.

5. The opening and closing body control apparatus for the vehicle according to claim 4, wherein the special state detection portion determines that the opening and closing body is in the special state when the vehicle is inclined causing the opening and closing body to be biased toward an open position or a closed position.

6. The opening and closing body control apparatus for the vehicle according to claim 5, further comprising
a support device supporting the opening and closing body; wherein
the special state detection portion determines that the opening and closing body is in the special state when the opening and closing body is disposed in an operation position where the opening and closing body is biased by a support force of the support device.

7. The opening and closing body control apparatus for the vehicle according to claim 5, wherein the special state detection portion determines that the opening and closing body is in the special state based on an environment temperature of the vehicle.

8. The opening and closing body control apparatus for the vehicle according to claim 4, further comprising a support device supporting the opening and closing body; wherein the special state detection portion determines that the opening and closing body is in the special state when the opening and closing body is disposed in an operation position where the opening and closing body is biased by a support force of the support device.

9. The opening and closing body control apparatus for the vehicle according to claim 4, wherein the special state detection portion determines that the opening and closing body is in the special state based on an environment temperature of the vehicle.

10. The opening and closing body control apparatus for the vehicle according to claim 9, further comprising a support device supporting the opening and closing body; wherein the special state detection portion determines that the opening and closing body is in the special state when the opening and closing body is disposed in an operation position where the opening and closing body is biased by a support force of the support device.

\* \* \* \* \*